United States Patent
Wood

(10) Patent No.: US 7,739,388 B2
(45) Date of Patent: Jun. 15, 2010

(54) METHOD AND SYSTEM FOR MANAGING DATA CENTER POWER USAGE BASED ON SERVICE COMMITMENTS

(75) Inventor: Douglas A. Wood, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 406 days.

(21) Appl. No.: 11/755,456

(22) Filed: May 30, 2007

(65) Prior Publication Data

US 2008/0301479 A1    Dec. 4, 2008

(51) Int. Cl.
  G06F 15/173  (2006.01)
  G06F 1/00    (2006.01)
  G06F 9/46    (2006.01)

(52) U.S. Cl. ............... 709/226; 709/223; 709/224; 713/300; 713/322; 718/104; 718/105

(58) Field of Classification Search ............ 709/223, 709/226, 224; 718/104, 105; 713/300, 322
See application file for complete search history.

(56) References Cited

U.S. PATENT DOCUMENTS

| 6,968,465 | B2 * | 11/2005 | Freevol et al. | 713/300 |
| 7,463,648 | B1 * | 12/2008 | Eppstein et al. | 370/468 |
| 2002/0103889 | A1 * | 8/2002 | Markson et al. | 709/223 |
| 2002/0169990 | A1 * | 11/2002 | Sherburne, Jr. | 713/300 |
| 2005/0141197 | A1 * | 6/2005 | Erturk et al. | 361/700 |
| 2005/0163168 | A1 * | 7/2005 | Sheth et al. | 370/537 |

* cited by examiner

*Primary Examiner*—Ranodhi N Serrao
(74) *Attorney, Agent, or Firm*—Dillon & Yudell LLP

(57) ABSTRACT

A method of managing data center power usage based on service commitments. A power and capacity management utility measures performance characteristics of applications hosted by a data center that include power consumption and transaction processing time. When the performance characteristics are above (or below) a first pre-defined target range, the utility decreases (or increases, respectively) a clock rate and processor voltage of one or more active servers. When the performance characteristics are within the first target range and the clock speed is above (or below) a second pre-defined target range, the utility activates (or deactivates, respectively) one or more inactive (or active, respectively) servers. When the size of an inactive server pool is above a third pre-defined target range, the utility moves inactive servers to an unallocated server pool. When the size of the inactive server pool is below the third target range, the utility allocates additional servers.

11 Claims, 2 Drawing Sheets

METHOD AND SYSTEM FOR MANAGING DATA CENTER POWER USAGE BASED ON SERVICE COMMITMENTS

BACKGROUND OF THE INVENTION

The present invention relates in general to data processing systems and in particular to server computers. Still more particularly, the present invention relates to an improved method and system for managing data center power usage based on service commitments.

Conventional data centers house hundreds, or even thousands of servers and other information technology (IT) hardware. A typical data center hosts many enterprise applications on the hardware the data center houses. Each application has formal or informal performance targets in terms of the number of transactions the application can process and the maximum allowable time to process a transaction. These targets are referred to as service level objectives or agreements (SLOs/SLAs). Each application is typically provisioned (i.e., assigned) with sufficient hardware to meet its SLO for the highest anticipated demand or transaction volume.

During periods of low processing demand from enterprise applications, idle data center servers, individual processors, and/or cores within single servers often continue to consume power. Data centers that are provisioned with a large number of hardware resources in order to meet maximum required demand levels thus consume high levels of power. However, conventional data center load management features are not fast enough to respond to changes in application workload in real time.

SUMMARY OF AN EMBODIMENT

Disclosed are a method, system, and computer storage medium for managing data center power usage based on service commitments. A power and capacity management utility measures performance characteristics of each application hosted by the data center. The performance characteristics include power consumption and transaction processing time. When the performance characteristics of an application are above a pre-defined target limit, the power and capacity management utility decreases the clock rate and processor supply voltage of one or more active servers assigned to the application, thereby decreasing the power consumption of the active servers and reducing performance until the performance characteristics are within a predefined range. If the clock speed of the servers assigned to the application is below a predetermined optimal value, servers are removed from the application and clock speed is increased, such that performance is held constant until clock speed is back in the target range.

When the performance characteristics are below a pre-defined target range or predictions based on current transaction volume indicate performance will fall below the range, the power and capacity management utility increases the clock rate and processor supply voltage of one or more active servers until performance is within the target range. If the clock speed of the servers assigned to an application is above some predefined optimal value, servers are added to the application and clock speed is reduced such that overall performance is held constant until the clock speed is back within the target range. Clock speed can be changed very quickly (on the order of milliseconds). Since it may take several minutes to move a server between active and inactive states, clock speed is used to respond to short term fluctuations in demand. Server activation and deactivation are used to manage longer term trends in demand. The optimal clock speed for each server is determined be a combination of the most efficient operating range of the server and the need to keep sufficient clock speed head room to meet short term demand spikes. The server groups may include web servers, application servers, database servers, and other data processing applications.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

The present invention provides a method, system, and computer storage medium for managing data center power usage based on service commitments.

Figure 1:
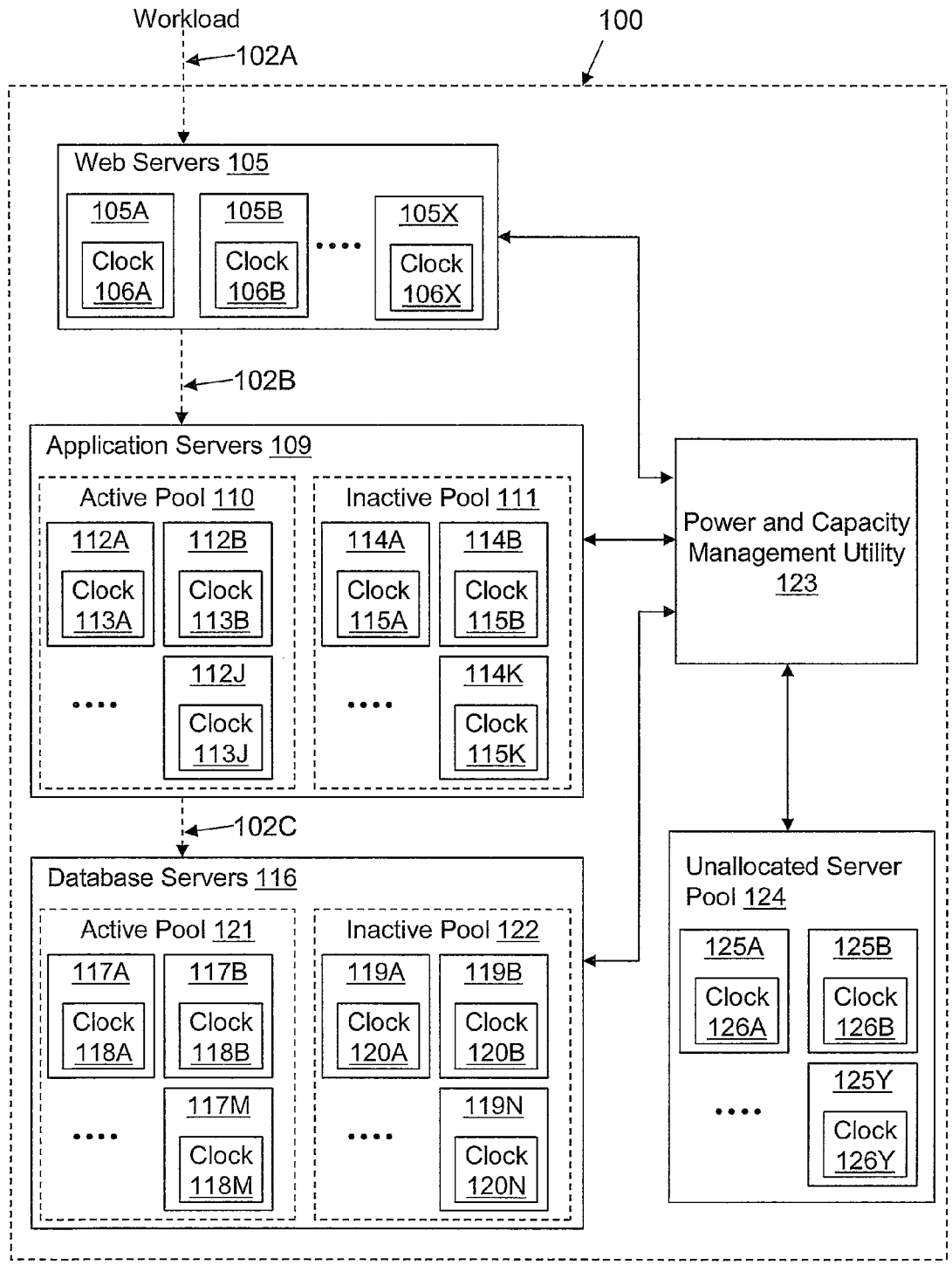
FIG. 1 depicts a high level block diagram of a data center, according to an embodiment of the present invention.

With reference now to FIG. 1, there is depicted a high level block diagram of a data center, according to an embodiment of the present invention. As shown, a data center 100 includes multiple groups of computer servers, including, but not limited to, web servers 105, application servers 109, database (DB) servers 116, and an unallocated server pool 124. Web servers 105A through 105X, where X is an integer, process an incoming workload 102A and pass a workload 102B to application servers 109. Application servers 109 include an active pool 110 of active servers 112A through 112J and an inactive pool 111 of inactive servers 114A through 114K. Similarly, DB servers 116 include an active pool 121 of active servers 117A through 117M and an inactive pool 122 of inactive servers 119A through 119N. As utilized herein, an active pool refers to a group of servers that performs processing operations on a workload (e.g., active pool 110 processes workload 102B and passes workload 102C to active pool 121). An inactive pool refers to a group of servers that are temporarily not allocated to processing workload.

According to the illustrative embodiment, data center 100 includes a power and capacity management utility 123. Each individual system within data center 100 includes a clock. The clocks generally control the speed at which each computer server within data center 100 performs processing operations. For example, clock 106A controls the processing speed (and thus power consumption) of web server 105A. Power and capacity management utility 123 selectively manipulates the local clock speed, voltage level, and load allocation (i.e., active or inactive states) of each individual server within data center 100. The power and capacity management utility 123 may thus slow the local clock speed of a first server and/or temporarily place a second server in an inactive state during a period of low processing demand in order to reduce the power consumption of data center 100 by reducing application performance without violating the service commitment (i.e., by staying within a pre-defined performance range). The process by which power and capacity management utility 123 reduces the power consumption of data center 100 is illustrated in FIG. 2, which is discussed below.

In one embodiment, power and capacity management utility 123 monitors the performance (i.e., power usage and/or processing time) of applications in data center 100 under different processing loads and/or different system power settings and collects historical data that includes the required clock speed at each processing load. Power and capacity management utility 123 utilizes the historical required clock speed data to create a reference table. Power and capacity management utility may subsequently refer to the pre-defined reference table in order to adjust the clock speed of each individual server and/or group of servers in real time as the incoming workload 102A changes (i.e., in response to varying transaction volumes).

In another embodiment, power and capacity management utility 123 utilizes application response measurement (ARM) to measure the performance of applications in data center 100 in real time, and power and capacity management utility 123 adjusts the number of servers assigned to process a given workload and/or the clock speed of the processing unit of each active server in order to keep the measured power usage as low as possible while simultaneously reducing application performance to a level that is close to the service commitment but does not violate the service commitment. The service commitment may correspond to a pre-defined target range, a default value, or a user-defined value. Power and capacity management utility 123 may also periodically send synthetic workload transactions through data center 100 in order to measure system performance. In yet another embodiment, power and capacity management utility 123 may combine multiple approaches (i.e., utilize a multi-tier server allocation and clock management system) to monitor and adjust the performance of data center 100. An exemplary method of implementing a multi-tier server allocation and clock management system is illustrated in FIG. 2, which is discussed below.

Figure 2:
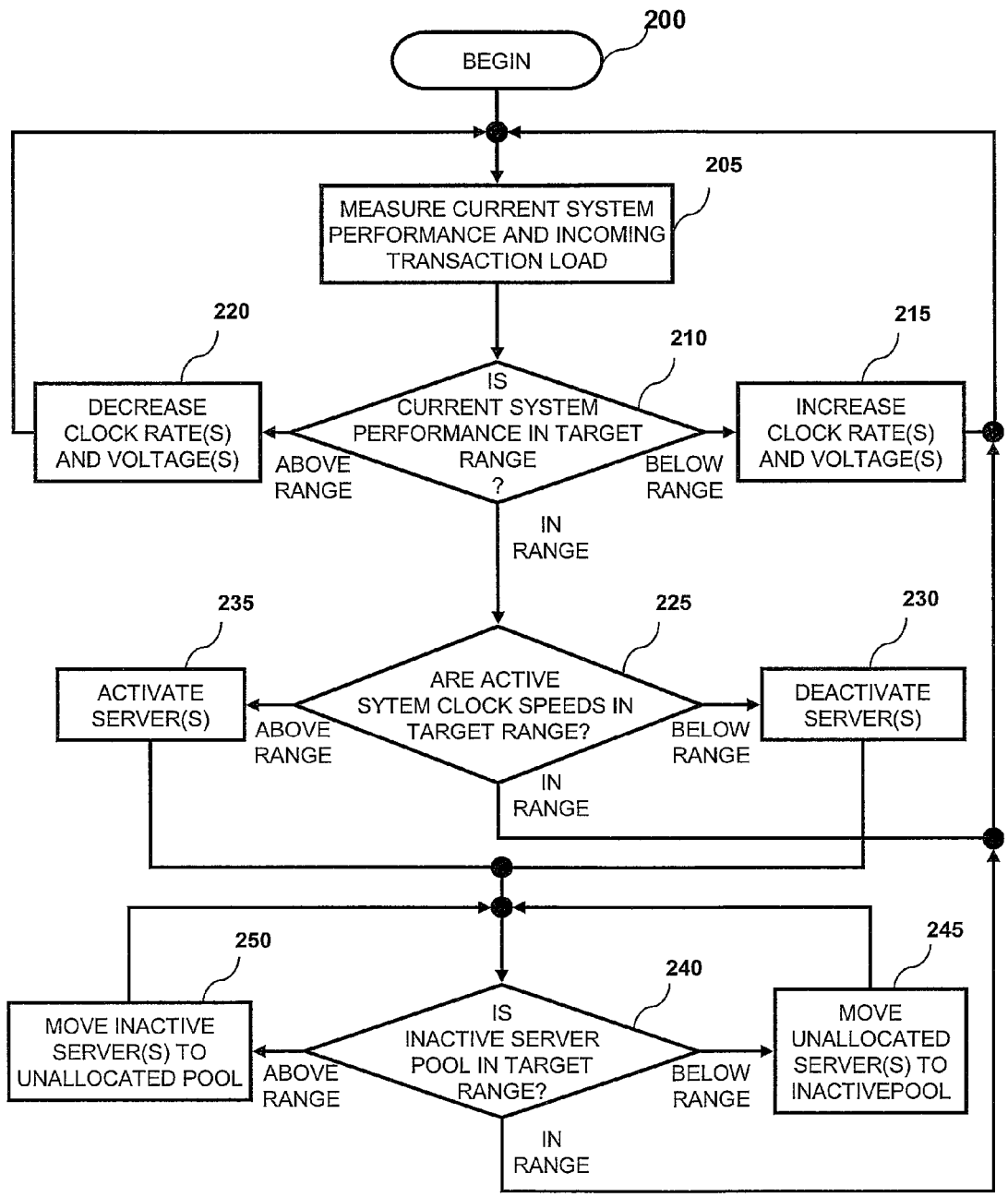
FIG. 2 is a high level logical flowchart of an exemplary method of managing data center power usage, according to an embodiment of the invention.

Turning now to FIG. 2, there is illustrated a high level logical flowchart of an exemplary method of managing data center power usage, according to an embodiment of the invention. The process begins at block 200 in response to an application in data center 100 receiving workload 102A. Power and capacity management utility 123 measures the current system performance (i.e., power consumption level and/or processing time) and the incoming transaction load (i.e., workload 102A), as depicted in block 205. At block 210, power and capacity management utility 123 determines whether the current system performance is within, above, or below a first pre-defined target range. If the current system performance of data center 100 is above the first pre-defined target range, power and capacity management utility 123 increases the clock rate and supply voltage of one or more servers in active server pools 110 and 121, as shown in block 215. The process subsequently returns to block 205, and power and capacity management utility 123 continues to monitor the performance of applications in data center 100.

If the current system performance of data center 100 is above the first pre-defined target range, power and capacity management utility 123 decreases the clock rate and supply voltage of one or more servers in active server pools 110 and 121, as shown in block 220. The process subsequently returns to block 205, and power and capacity management utility 123 continues to monitor the performance of applications in data center 100.

If the current system performance of data center 100 is within the first pre-defined target range, power and capacity management utility 123 determines whether the current clock speeds of one or more servers in active server pools 110 and 121 are within, above, or below a second pre-defined target range, as shown in block 225. If the current clock speeds of the active servers are below the second pre-defined target range, power and capacity management utility 123 deactivates one or more servers in active server pools 110 and 121 (i.e., moves servers to inactive server pools 111 and 122, respectively), as shown in block 230, and the process proceeds to block 240.

If the current clock speeds of the active servers are above the second pre-defined target range, power and capacity management utility 123 increases the number of servers in active server pools 110 and 121 (i.e., moves servers from inactive server pools 111 and 122 to active server pools 110 and 121, respectively), as shown in block 235, and the process proceeds to block 240. If the current clock speeds of the active servers are within the second pre-defined target range, the process returns to block 205, and power and capacity management utility 123 continues to monitor the performance of applications in data center 100.

At block 240, power and capacity management utility 123 determines whether the size of inactive server pools 111 and 122 is within, above, or below a third pre-defined target range. If the current size of inactive server pools 111 and 122 is within the third pre-defined target range, the process returns to block 205, and power and capacity management utility 123 continues to monitor the performance of data center 100.

If the current size of inactive server pools 111 and 122 is below the third pre-defined target range, power and capacity management utility 123 adjusts inactive server pools 111 and/or 122 by allocating one or more servers from unallocated server pool 124 to inactive server pools 111 and/or 122 to meet potential increased long term demand levels, as depicted in block 245. Allocating a server to an inactive pool implies configuring the server to handle the workload associated with the pool to which the server is assigned. Unallocated servers 125A through 125Y may thus be allocated to contribute to the processing of one or more server groups (i.e. web servers 105, application servers 109, and/or DB servers 116). The process subsequently returns to block 240, and power and capacity management utility 123 re-evaluates the size of inactive server pools 111 and 122.

If the size of inactive server pools 111 and 122 is above the third pre-defined target range, power and capacity management utility 123 decreases the size of inactive server pools 111 and/or 122 by de-allocating one or more servers from inactive server pools 111 and/or 122 (i.e., moving inactive servers to unallocated server pool 124), as depicted in block 250. Unallocated servers may later be allocated to the any inactive pool of any application. The process subsequently returns to block 240, and power and capacity management utility 123 re-evaluates the size of inactive server pools 111 and 122.

In an alternate embodiment, the functions performed by power and capacity management utility 123 may instead be performed by multiple individual utilities, including, but not limited to, a power management utility and a capacity management utility. The power management utility and the capacity management utility may interact (i.e., negotiate) to optimize the performance characteristics of data center 100 by adjusting the clock speed, the processor unit supply voltage, and the number of active servers that are allocated to different applications.

The present invention thus provides a method, system, and computer storage medium for managing data center power usage based on service commitments. Power and capacity management utility 123 measures performance characteristics of applications hosted by data center 100 that include power consumption and transaction processing time. When the performance characteristics are above a first pre-defined target range, power and capacity management utility 123 decreases a clock rate and processor voltage of one or more active servers. When performance characteristics are below the first pre-defined target range, power and capacity management utility 123 increases the clock rate and processor voltage of one or more active servers. When the performance characteristics are within the first pre-defined target range and the clock speed is below a second pre-defined target range, power and capacity management utility 123 deactivates one or more active servers. When the performance characteristics are within the first pre-defined target range and the clock speed is above a second pre-defined target range, power and capacity management utility 123 activates one or more inactive servers. When the size of inactive server pools 111 and/or 122 is above a third pre-defined target range, power and capacity management utility 123 moves inactive servers to an unallocated server pool. When the power consumption of the inactive server pools 111 and/or 122 is below the third pre-defined target range, power and capacity management utility 123 allocates additional servers to inactive server pools 111 and/or 122.

It is understood that the use herein of specific names are for example only and not meant to imply any limitations on the invention. The invention may thus be implemented with different nomenclature/terminology and associated functionality utilized to describe the above devices/utility, etc., without limitation.

In the flow chart (FIG. 2) above, while the process steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

While an illustrative embodiment of the present invention has been described in the context of a fully functional data center server system with installed software, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as thumb drives, floppy disks, hard drives, CD ROMs, DVDs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method comprising:
   defining, in a data center, a plurality of server groups each allocated to process a respective different one of a plurality of application workloads, wherein each of the plurality of server groups includes:
      one or more active server computers that process the application workload characterizing the server group; and
      an inactive server pool containing zero or more currently inactive server computers that, while inactive, do not process the application workload characterizing the server group;
   defining in the data center an unallocated server pool containing only unallocated server computers not currently allocated to any of the plurality of server groups;
   measuring performance characteristics of the plurality of application workloads running on the plurality of server groups of the data center, wherein said performance characteristics include power consumption and transaction processing time, wherein said measuring performance characteristics further comprises periodically measuring performance characteristics utilizing synthetic rather than actual workload transactions;
   in response to said performance characteristics being above a first pre-defined target range, decreasing a clock rate of an active server computer in said data center;
   in response to said performance characteristics being below said first pre-defined target range, increasing said clock rate of said active server computer in the data center;
   in response to said performance characteristics being within said first pre-defined target range and said clock rate being below a second pre-defined target range, deactivating an active server computer within one of the plurality of server groups and placing the deactivated server in the inactive server pool of that one of the plurality of server groups;
   in response to said performance characteristics being within said first pre-defined target range and said clock rate being above the second pre-defined target range, activating an inactive server computer within one of said inactive server pools and removing the activated server computer from that one of the inactive server pools;
   in response to a size of one of the inactive server pools being above a third pre-defined target range, deallocating an inactive server computer from one of the inactive server pools and placing the deallocated server computer in the unallocated server pool; and
   in response to said size of one of the inactive server pools being below said third pre-defined target range, allocating an additional server computer from said unallocated server pool to the one of the inactive server pools and removing the allocated server computer from the unallocated server pool.

2. The method of claim 1, wherein:
   said plurality of server groups comprises, a first server group containing only application server computers and a second server group containing only database server computers; and
   the data center further includes a third server group including web server computers.

3. The method of claim 1, wherein decreasing said clock rate further comprises decreasing a processor supply voltage of said one or more active server computers.

4. The method of claim 1, and further comprising:
   adjusting the clock rate of a server computer in real time as its application workload changes by reference to a pre-defined data structure.

5. A data center comprising:
   a plurality of server groups each allocated to process a respective different one of a plurality of application workloads, wherein each of the plurality of server groups includes:
      one or more active server computers that process the application workload characterizing the server group, wherein said one or more active server computers include one or more microprocessors; and an inactive server pool containing zero or more currently inactive server computers that, while inactive, do not process the application workload characterizing the server group;

an unallocated server pool containing only unallocated server computers not currently allocated to any of the plurality of server groups; and a power and capacity management utility, wherein said power and capacity management utility causes the data center to perform:

measuring performance characteristics of a the plurality of application workloads running on said plurality of server groups of the data center, wherein said performance characteristics include power consumption and transaction processing time, wherein the rower and capacity management utility is further configured to periodically measure performance characteristics utilizing synthetic rather than actual workload transactions;

in response to said performance characteristics being above a first pre-defined target range, decreasing a clock rate of an active server computer in the data center;

in response to said performance characteristics being below said first pre-defined target range, increasing said clock rate of said active server computer in the data center;

in response to said performance characteristics being within said first pre-defined target range and said clock rate being below a second pre-defined target range, deactivating an active server computer within one of the included in a plurality of server groups and placing the deactivated server in the inactive server pool of that one of the plurality of server groups;

in response to said performance characteristics being within said first pre-defined target range and said clock rate being above a the second pre-defined target range, activating an inactive server computer within one of the inactive server pools and removed the activated server computer from that one of the inactive server pools;

in response to a size of one of the inactive server pools being above a third pre-defined target range, deallocating an inactive server computer from one of the inactive server pools and placing the deallocated server computer in the to-an unallocated server pool; and in response to said size of one of the inactive server pools being below said third pre-defined target range, allocating an additional server computer from said unallocated server pool to the one of the inactive server pools and removing the allocated server computer from the unallocated server pool.

6. The data center of claim 5, wherein said plurality of server groups comprises a first server group containing only application server computers and a second server group containing only database server computers.

7. The data center of claim 5, wherein the power and capacity management utility causes the data center to decrease the clock rate by decreasing a processor supply voltage of said active server computer.

8. The data center of claim 5, wherein the power and capacity management utility is further configured to adjust the clock rate of a server computer in real time as its application workload changes by reference to a predefined data structure.

9. A non-transitory computer-readable storage medium for managing a data center including a plurality of server groups each allocated to process a respective different one of a plurality of application workloads and an unallocated server pool containing only unallocated server computers not currently allocated to any of the plurality of server groups, wherein each of the plurality of server groups includes one or more active server computers that process the application workload characterizing the server group and an inactive server pool containing zero or more currently inactive server computers that, while inactive, do not process the application workload characterizing the server group, said non-transitory computer-readable storage medium being encoded with a computer program that, when executed, causes data center hardware to perform:

measuring performance characteristics of a plurality of application workloads running on the plurality of server groups of the data center, wherein said performance characteristics include power consumption and transaction processing time, wherein the computer program is further configured to periodically measure performance characteristics utilizing synthetic rather than actual workload transactions;

in response to said performance characteristics being above a first pre-defined target range, decreasing a clock rate of an active server computer in said data center;

in response to said performance characteristics being below said first pre-defined target range, increasing said clock rate of said active server computer in the data center;

in response to said performance characteristics being within said first pre-defined target range and said clock rate being below a second pre-defined target range, deactivating an active server computer within one of the plurality of server groups and placing the deactivated server in the inactive server pool of that one of the plurality of server groups;

in response to said performance characteristics being within said first pre-defined target range and said clock rate being above the second pre-defined target range, activating an inactive server computer within one of said inactive server pools and removing the activated server computer from that one of the inactive server pools;

in response to a size of one of the inactive servers pools being above a third pre-defined target range, deallocating an inactive server computer from one of the inactive server pools and placing the deallocated server computer in the unallocated server pool; and in response said size of one of the inactive server pools being below said third pre-defined target range, allocating an additional server computer from said unallocated server pool to said plurality of inactive server pools and removing the allocated server computer from the unallocated server pool.

10. The non-transitory computer-readable storage medium of claim 9, wherein the computer program causes the data center to decrease the clock rate by decreasing a processor supply voltage of said active server computer.

11. The non-transitory computer-readable storage medium of claim 9, wherein the computer program is further configured to adjust the clock rate of a server computer in real time as its application workload changes by reference to a predefined data structure.

* * * * *